R. M. HUTTON.
ARMORED CABLE COUPLING.
APPLICATION FILED APR. 22, 1915.
1,191,078.
Patented July 11, 1916.
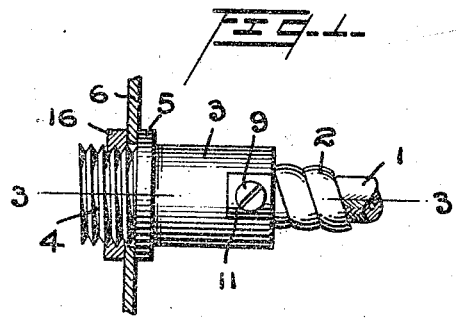
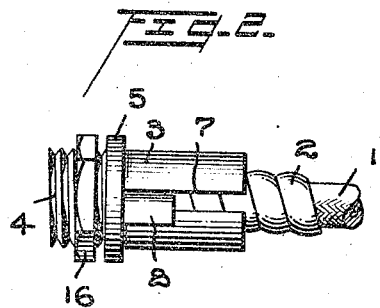
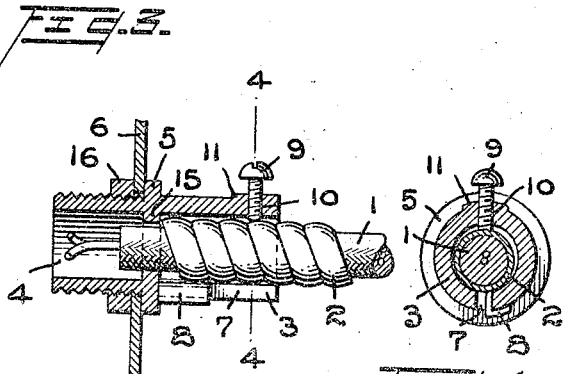 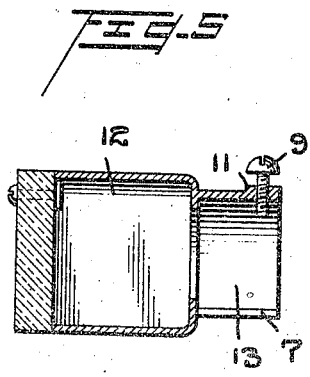
Witnesses
Inventor
Raymond M. Hutton
By Joshua R. H. Potts
his Attorney

UNITED STATES PATENT OFFICE.

RAYMOND M. HUTTON, OF PHILADELPHIA, PENNSYLVANIA.

ARMORED-CABLE COUPLING.

1,191,078.  Specification of Letters Patent.  Patented July 11, 1916.

Application filed April 22, 1915. Serial No. 23,081.

*To all whom it may concern:*

Be it known that I, RAYMOND M. HUTTON, a citizen of the United States, residing at Philadelphia, in the county of Philadelphia and State of Pennsylvania, have invented certain new and useful Improvements in Armored-Cable Couplings, of which the following is a specification.

My invention relates to improvements in armored cable couplings, the object of the invention being to provide a simple inexpensive coupling designed to connect an armored cable with a terminal or other box, and which will securely hold the cable preventing rotary movement of the cable in the coupling, and thereby preventing possibility of disconnection.

A further object is to provide a coupling in which a screw is employed to engage the armored cable, and said coupling member having a slot therein to receive a bent tongue on the armored cable, preventing rotary movement of the cable or coupling vary the position of the coupling relative to the cable.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improved cable coupling, showing the same in position in the wall of a box. Fig. 2 is a view in elevation of the opposite side of the coupling shown in Fig. 1. Fig. 3 is a view in longitudinal section on the line 3—3 of Fig. 1. Fig. 4 is a view in transverse section on the line 4—4 of Fig. 3, and Fig. 5 is a view in longitudinal section illustrating my invention as applied to a condulet.

1 represents a cable with an ordinary spirally wound metal armor 2 thereon, and 3 is one of my improved coupling members. The coupling member 3 is hollow, and of general cylindrical form having an externally screw-threaded nipple 4 at one end with an annular flange 5 between the threaded portion 4 and the cylindrical body portion of the coupling member 3. The screw-threaded nipple 4 is adapted to be projected through the opening in a box 6, and a jam nut 16 is located on the nipple and clamps the wall of the box between said nut and the annular flange 5.

The cylindrical body portion 3 is provided with a longitudinal slot 7 extending to the end of the coupling member, and adapted to receive a tongue 8 bent from the spirally wound armor 2. In other words, the armor 2 is partially unwound to form a tongue 8, and this tongue is positioned through the slot 7, and then bent downwardly against the outer face of the coupling member, so that the armor and coupling member are held against any appreciable independent turning movement.

9 represents a screw which is projected through a threaded opening 10 in a reinforced portion 11 of the member 3, and this screw is located preferably at the side of the coupling member opposite to the slot 7. The coupling is provided with an internal annular flange 15 which acts as an abutment against the end of the metal armor. When the screw is forced inwardly, so that its inner end is preferably located between the convolutions of the armored cable 2, and the tongue 8 is projected through the slot 7, the parts are held against any appreciable independent turning or longitudinal movement, hence the cable and the coupling member are rigidly secured. Fig. 5 illustrates my invention in connection with a condulet, and I have illustrated the said condulet 12 as having a cylindrical extension 13 with a screw 9 and a slot 7 to receive the armored cable precisely as above described in connection with the other form of coupling.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with an armored cable and a coupling member, of a screw carried by the coupling member and adapted to bear against the armored cable, said coupling having a longitudinal slot therein, and a tongue bent from the cable armor and projected through the slot, substantially as described.

2. The combination with an armored cable and a coupling member, of a screw carried by the coupling member and adapted to be projected between the convolutions of the armored cable, said coupling having a longitudinal slot therein, a tongue bent from the cable armor and projected through the slot, said tongue bent against the outer face of the coupling member, and a screw-threaded extension on the end of the coupling member, substantially as described.

3. The combination with an armored cable and a coupling member, said coupling member located on the end of the armored cable and having an internal annular flange against which one end of the armor engages, said coupling member having a longitudinal slot therein, a tongue bent from the cable armor and projected through the slot, and a screw carried by the coupling member and bearing against the cable armor, substantially as described.

In testimony whereof I have signed my name to this specification in the presence of a subscribing witness.

RAYMOND M. HUTTON.

Witness:
MARIE JACKSON.